United States Patent
Okada et al.

(10) Patent No.: US 11,584,212 B2
(45) Date of Patent: Feb. 21, 2023

(54) BATTERY PACK HAVING OVERLAPPING BATTERY MODULES

(71) Applicant: HONDA MOTOR CO., LTD., Tokyo (JP)

(72) Inventors: Tomoyuki Okada, Saitama (JP); Yoshiro Ichikawa, Saitama (JP); Tomofumi Yasuda, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 76 days.

(21) Appl. No.: 17/193,679

(22) Filed: Mar. 5, 2021

(65) Prior Publication Data

US 2021/0276405 A1 Sep. 9, 2021

(30) Foreign Application Priority Data

Mar. 6, 2020 (JP) .............................. JP2020-039010

(51) Int. Cl.
*B60K 1/04* (2019.01)
*H01M 50/204* (2021.01)
*B60L 50/60* (2019.01)
*B60L 50/64* (2019.01)

(52) U.S. Cl.
CPC ............... *B60K 1/04* (2013.01); *B60L 50/64* (2019.02); *B60L 50/66* (2019.02); *H01M 50/204* (2021.01); *B60K 2001/0405* (2013.01)

(58) Field of Classification Search
CPC ........ B60L 50/64; B60L 50/66; H01M 50/204
See application file for complete search history.

(56) References Cited

U.S. PATENT DOCUMENTS

| | | | | |
|---|---|---|---|---|
| 9,178,192 B2 * | 11/2015 | Payne | ................. | H01M 50/503 |
| 10,020,483 B2 * | 7/2018 | Merriman | ........... | H01M 50/524 |
| 10,411,233 B2 * | 9/2019 | Yoon | ................... | H01M 50/271 |
| 10,486,516 B2 * | 11/2019 | Yamanaka | ............. | B62D 21/02 |
| 2004/0099397 A1 * | 5/2004 | Sasaoka | ............. | B22D 19/0009 |
| | | | | 164/113 |
| 2012/0057316 A1 | 3/2012 | Kaneshige et al. | | |

(Continued)

FOREIGN PATENT DOCUMENTS

| | | |
|---|---|---|
| CN | 102386448 A | 3/2012 |
| CN | 107534110 A | 1/2018 |

(Continued)

OTHER PUBLICATIONS

Dec. 2, 2022, Chinese Office Action issued for related CN Application No. 202110195019.6.

*Primary Examiner* — James M Dolak
*Assistant Examiner* — James J Triggs
(74) *Attorney, Agent, or Firm* — Paratus Law Group, PLLC (57) ABSTRACT

A battery pack includes a first battery module, a first battery case accommodating the first battery module, a second battery module, and a second battery case placed on an upper side of the first battery case so as to overlap each other and accommodating the second battery module. The second battery module is fixed to a fastening portion formed on a bottom surface of the second battery case and bulging downward. A hole portion for accommodating the fastening portion is provided on an upper surface of the first battery case at a position overlapping the fastening portion when viewed from above.

4 Claims, 10 Drawing Sheets

(56) References Cited

U.S. PATENT DOCUMENTS

| | | |
|---|---|---|
| 2016/0359152 A1 | 12/2016 | Nakayama |
| 2018/0019456 A1 | 1/2018 | Nakayama |
| 2018/0241021 A1 | 8/2018 | Kim et al. |
| 2018/0254444 A1 | 9/2018 | Yoon et al. |
| 2020/0067037 A1 | 2/2020 | Zeng et al. |
| 2020/0076019 A1 | 3/2020 | Ohkuma |
| 2021/0050568 A1* | 2/2021 | Yang .................. H01M 50/502 |
| 2021/0107344 A1 | 4/2021 | Menon et al. |
| 2021/0194086 A1 | 6/2021 | Ohkuma et al. |

FOREIGN PATENT DOCUMENTS

| | | |
|---|---|---|
| CN | 107949931 A | 4/2018 |
| CN | 108717962 A | 10/2018 |
| JP | 2015-088312 A | 5/2015 |
| JP | 2017-004604 A | 1/2017 |
| JP | 2019-189168 A | 10/2019 |
| JP | 2020-035709 A | 3/2020 |
| WO | WO 2020/044717 A1 | 3/2020 |

\* cited by examiner

BATTERY PACK HAVING OVERLAPPING BATTERY MODULES

CROSS-REFERENCE TO RELATED APPLICATIONS

The present application claims the benefit of priority of Japanese Patent Application No. 2020-039010, filed on Mar. 6, 2020, the content of which is incorporated herein by reference.

TECHNICAL FIELD

The present invention relates to a battery pack mounted on an electric vehicle or the like.

BACKGROUND ART

In a recent year, electric vehicles such as electric automobiles using a motor as a driving source and hybrid automobiles using an engine and a battery as a driving source have been known in place of gasoline vehicles equipped with only an engine as a driving source. Those electric vehicles are equipped with batteries which supply electric power to the motors. For example, in an electric vehicle described in JP2015-088312A, a battery case accommodating a plurality of batteries is mounted under a floor.

In such an electric vehicle, it is necessary to install more batteries in order to extend the mileage that can be traveled by a motor. To install more batteries, for example, as in a battery pack described in JP2015-088312A, it is conceivable to form one battery pack by stacking and fixing two battery modules in an up-down direction with a plate portion interposed between them.

SUMMARY

However, when two battery modules are stacked in the up-down direction, the height in a passenger compartment may be lowered and the comfort of an occupant may be impaired unless the up-down dimension is kept low. In particular, when two battery cases accommodating batteries are stacked in the up-down direction, it is advantageous in terms of temperature adjustment and handleability, but the dimensions in the up-down direction tend to be large.

The present invention provides a battery pack capable of suppressing an increase in size in an up-down direction even when two battery cases are stacked in the up-down direction.

According to an aspect of the present invention, there is provided a battery pack including:

a first battery module;

a first battery case accommodating the first battery module;

a second battery module, and a second battery case placed on an upper side of the first battery case so as to overlap each other and accommodating the second battery module.

The second battery module is fixed to a fastening portion formed on a bottom surface of the second battery case and bulging downward.

A hole portion for accommodating the fastening portion is provided on an upper surface of the first battery case at a position overlapping the fastening portion when viewed from above.

According to the present invention, it is possible to prevent the battery pack from becoming large in the up-down direction.

DESCRIPTION OF EMBODIMENTS

Hereinafter, each embodiment of a battery pack of the present invention will be described with reference to the accompanying drawings. In the drawing, the front of the battery pack is shown as Fr, the rear is shown as Rr, the left side is shown as L, the right side is shown as R, the upper side is shown as U, and the lower side is shown as D. The front, rear, left, right, top, and bottom of the battery pack are irrelevant to the front, rear, left, right, top, and bottom of a vehicle on which the battery pack is mounted.

Figure 1:
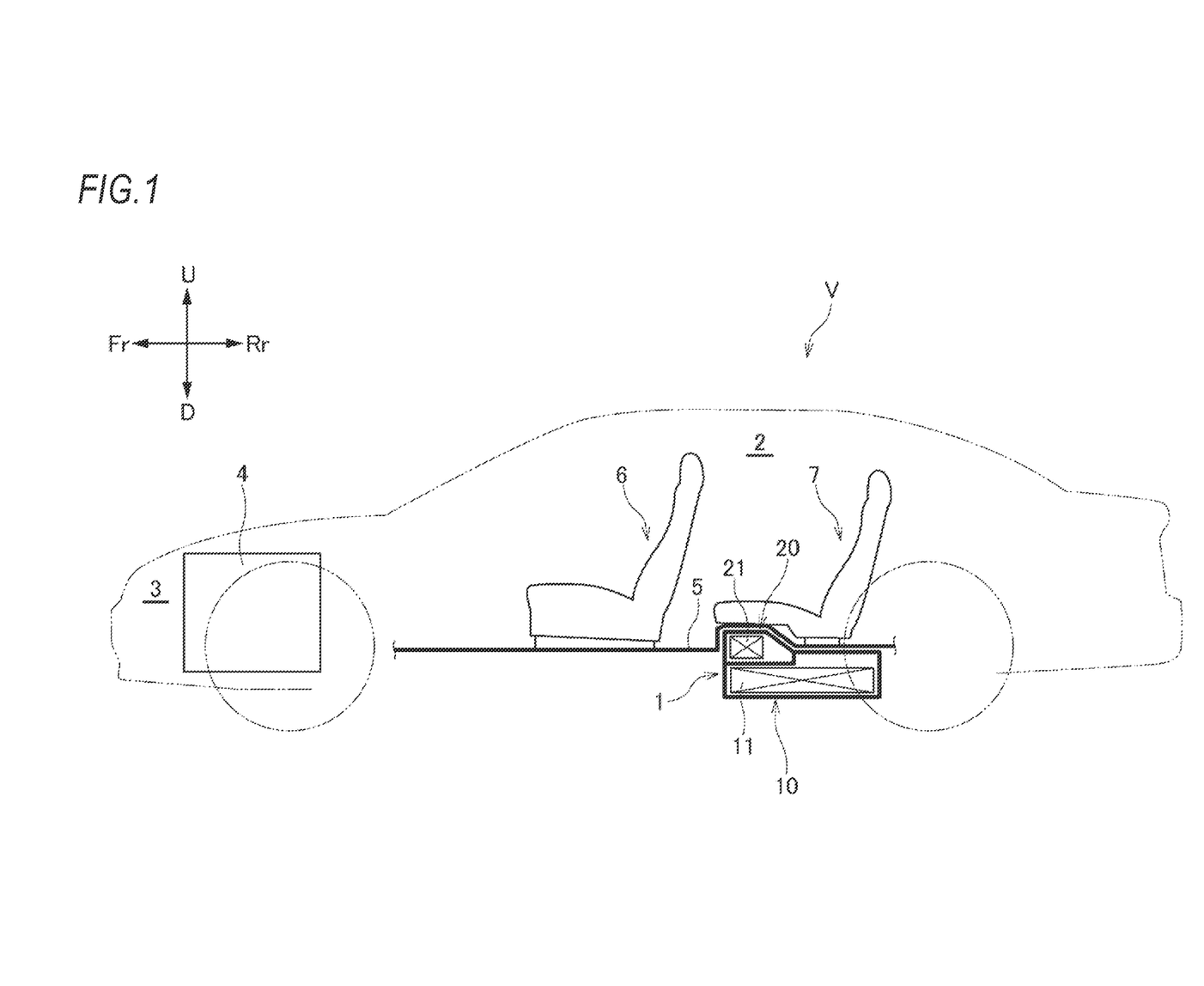
FIG. 1 is a schematic side view of a vehicle equipped with a battery pack according to an embodiment of the present invention.

As illustrated in FIG. 1, a vehicle V of the embodiment is, for example, an electric vehicle. In the vehicle V, an electric motor 4 is mounted in a front room 3 in front of a passenger compartment 2 and the electric motor 4 is electrically connected to a battery pack 1 mounted below a floor panel 5. A front seat 6 and a rear seat 7 are arranged in the passenger compartment 2 and the battery pack 1 is arranged further below the floor panel 5 below the rear seat 7.

Figure 2:
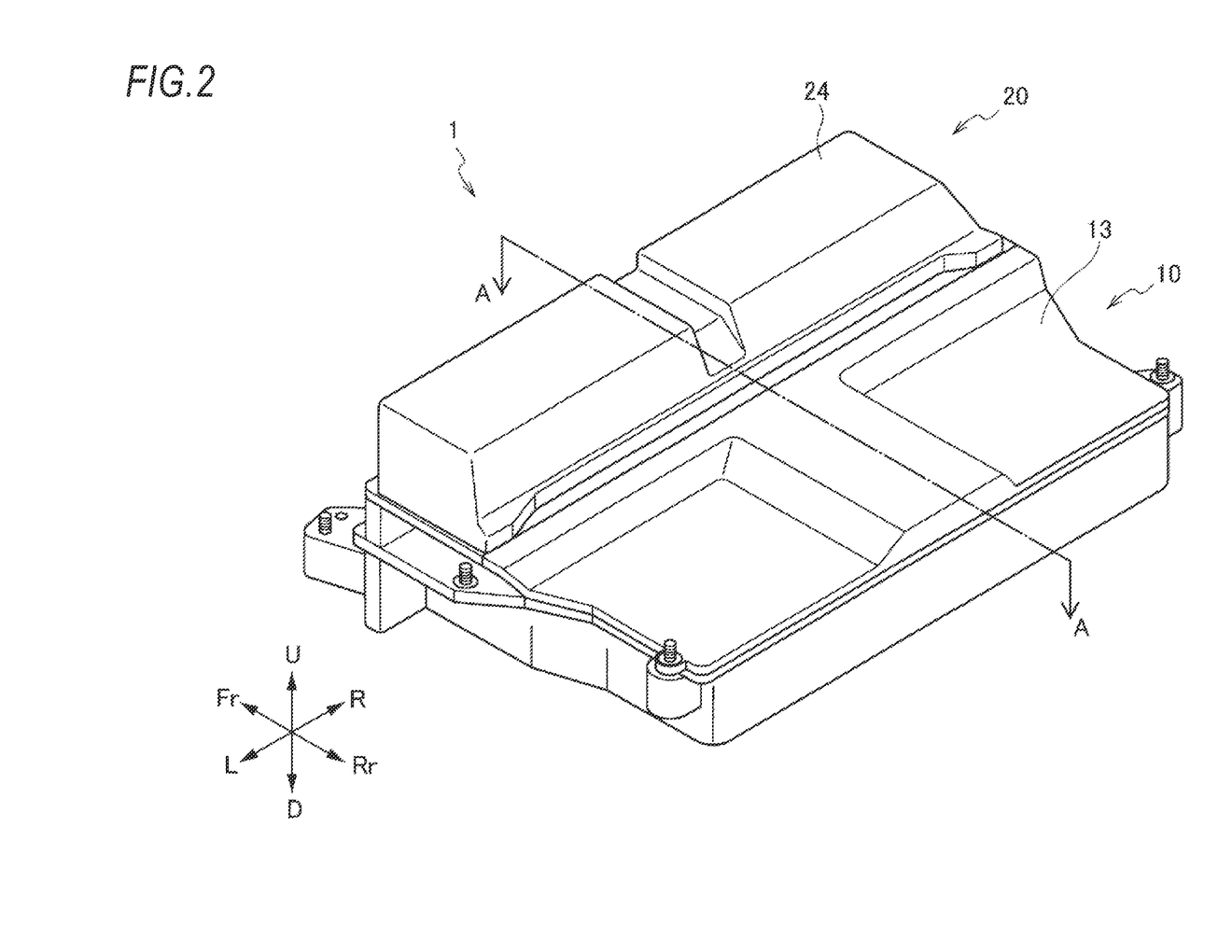
FIG. 2 is a perspective view of the battery pack of FIG. 1.
Figure 3:
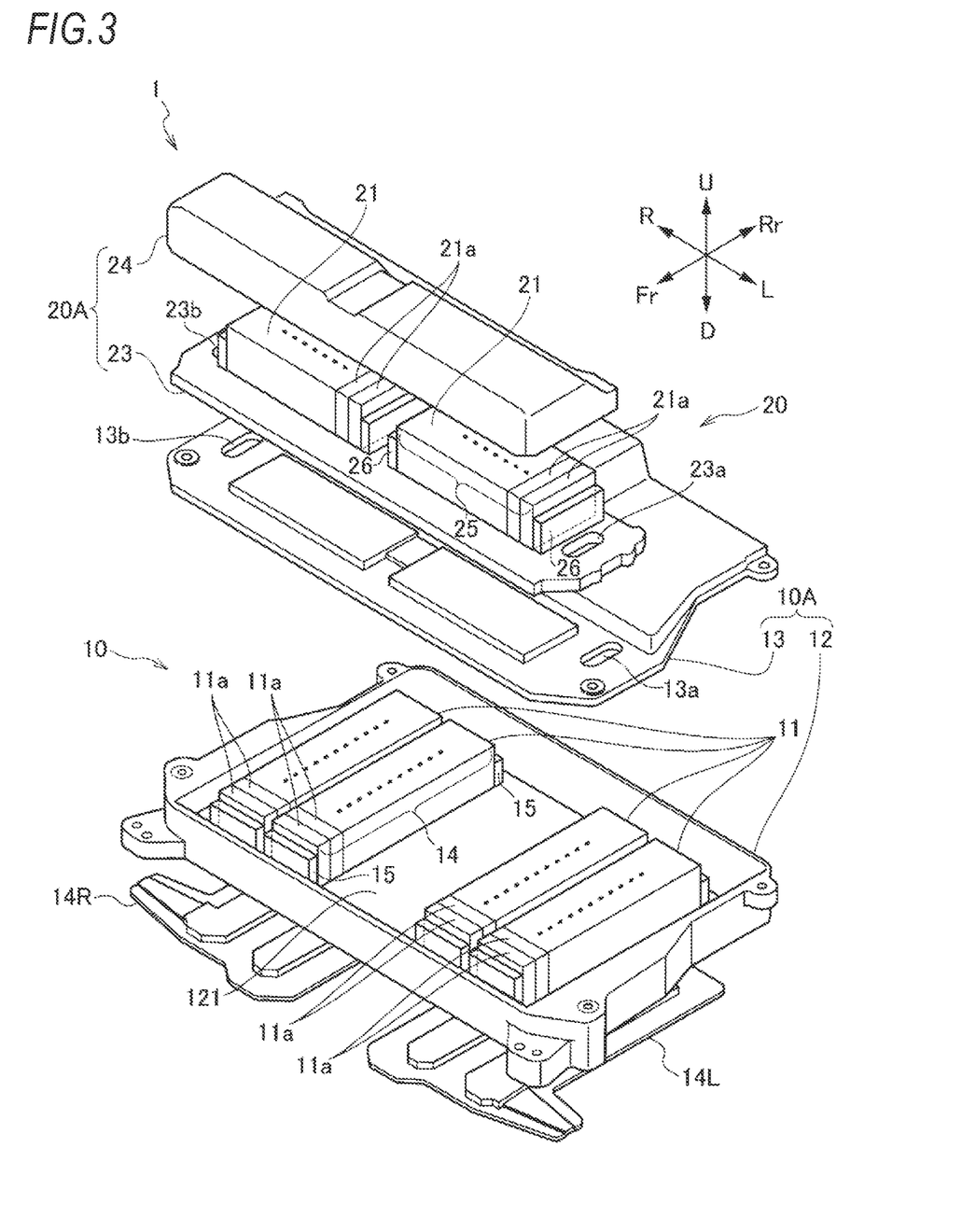
FIG. 3 is an exploded perspective view of the battery pack of FIG. 1.

As illustrated in FIGS. 2 and 3, the battery pack 1 of the embodiment includes a first battery pack 10 and a second battery pack 20 arranged above the first battery pack 10.

The first battery pack 10 includes a plurality of (four in this example) battery modules (hereinafter referred to as "first battery module") 11, a first battery case 10A accommodating the first battery modules 11, and a first cooling mechanism 40A (see FIG. 6) for cooling the first battery modules 11. The first battery case 10A is composed of a first case body 12 and a first case cover 13 which closes an opening portion in an upper side of the first case body 12.

As illustrated in FIG. 3, the first battery module 11 includes a lower cell laminated body 14 formed by laminating a plurality of battery cells 11a in a front-rear direction and a pair of end plates 15 arranged on both sides of the lower cell laminated body 14 in the front-rear direction (lamination direction). In the first battery module 11, the lower cell laminated body 14 and the pair of end plates 15 are integrally assembled by a bind bar (not illustrated). The first battery modules 11 are arranged side by side in a left-right direction orthogonal to the front-rear direction.

As illustrated in FIGS. 2 and 3, the second battery pack 20 includes two battery modules (hereinafter, referred to as "second battery module") 21, a second battery case 20A accommodating the second battery module 21, and a second cooling mechanism 40B (see FIG. 6) for cooling the second battery module 21. The second battery case 20A includes a bottom plate 23 on which the two second battery modules 21 are installed and a second case cover 24 which covers the bottom plate 23.

Each second battery module 21 includes an upper cell laminated body 25 composed of a plurality of battery cells 21a laminated in the left-right direction and a pair of end plates 26 arranged on both sides of the upper cell laminated body 25 in the left-right direction (lamination direction). In the second battery module 21, the upper cell laminated body 25 and the pair of end plates 26 are integrally assembled by a bind bar (not illustrated). The second battery modules 21 are arranged side by side in the left-right direction, which is the same direction as the lamination direction of the battery cells 21a.

The second battery case 20A is arranged so as to be overlapped above the first battery case 10A, so that the second battery pack 20 is arranged above the first battery pack 10. Further, the second battery pack 20 is arranged on a front side of the first battery pack 10. Therefore, as illustrated in FIG. 1, the height of the battery pack 1 is high in the front and low in the rear, and is aligned with a seat surface of the rear seat 7. This allows the battery pack 1 to be placed under a seat of the vehicle without compromising occupant comfort.

As illustrated in FIG. 3, a first communication hole 13a and a second communication hole 13b are provided in the vicinities of both ends of the first case cover 13 in the left-right direction. In the vicinities of both ends of the bottom plate 23 of the second battery pack 20 in the left-right direction, a first communication hole 23a and a second communication hole 23b which respectively communicate with the first communication hole 13a and the second communication hole 13b of the first case cover 13 are provided. The first battery module 11 and the second battery module 21 are electrically connected by a conductive member (not illustrated) passing through the first communication holes 13a and 23a and the second communication holes 13b and 23b.

The first battery pack 10 and the second battery pack 20 are fixed to each other by fastening members 33 (see FIGS. 8 and 9) such as bolts. Specifically, the first case cover 13 of the first battery case 10A and the bottom plate 23 of the second battery case 20A are fixed by the fastening member 33.

Figure 8:
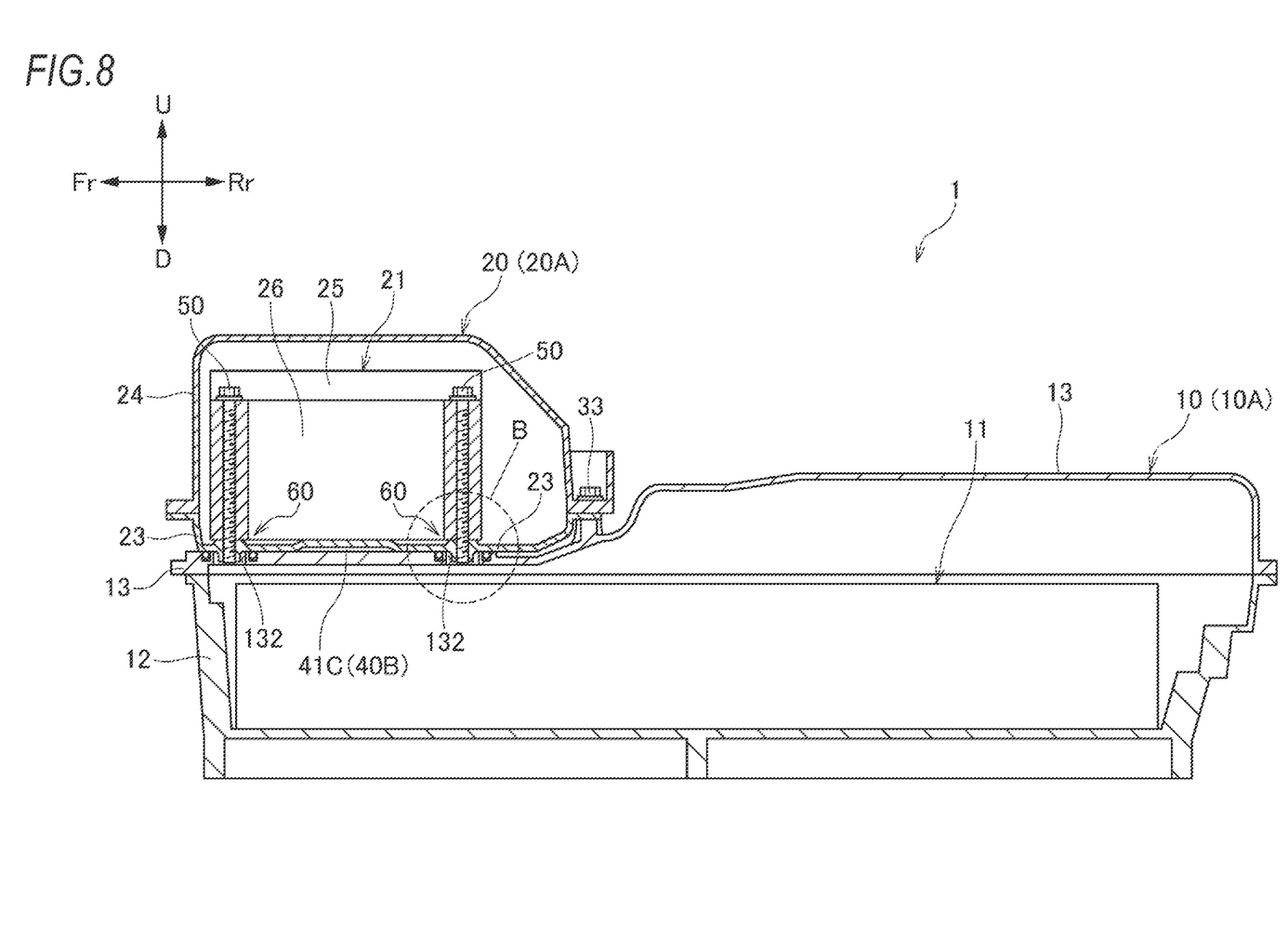
FIG. 8 is a cross-sectional view taken along the line A-A of FIGS. 2 and 7.

Further, as illustrated in FIG. 8, the second battery module 21 is fastened to the bottom plate 23 of the second battery case 20A by a pair of bolts 50 penetrating both ends in the front-rear direction of each end plate 26. The fixed structure of the second battery module 21 will be described in detail below. The first battery module 11 is also fastened to a bottom surface of the first battery case 10A by a pair of bolts 50 penetrating both ends in the left-right direction of each end plate 15, but the detailed description thereof will be omitted here.

Temperature Adjusting Mechanism

Next, the first cooling mechanism 40A and the second cooling mechanism 40B as a temperature adjusting mechanism will be described with reference to FIGS. 4 to 6.

Figure 4:
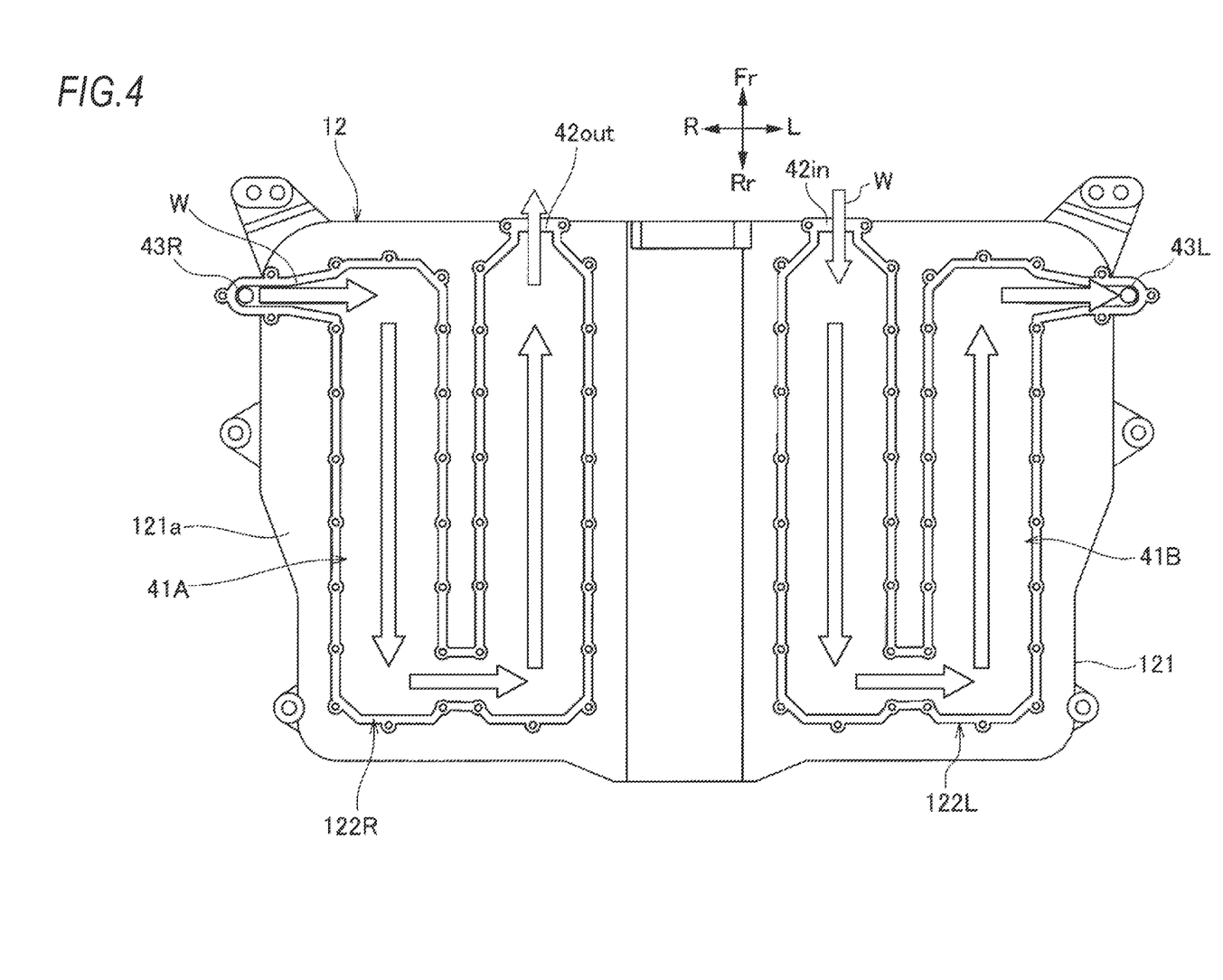
FIG. 4 is a diagram illustrating a refrigerant flow path of a first battery module.
Figure 5:
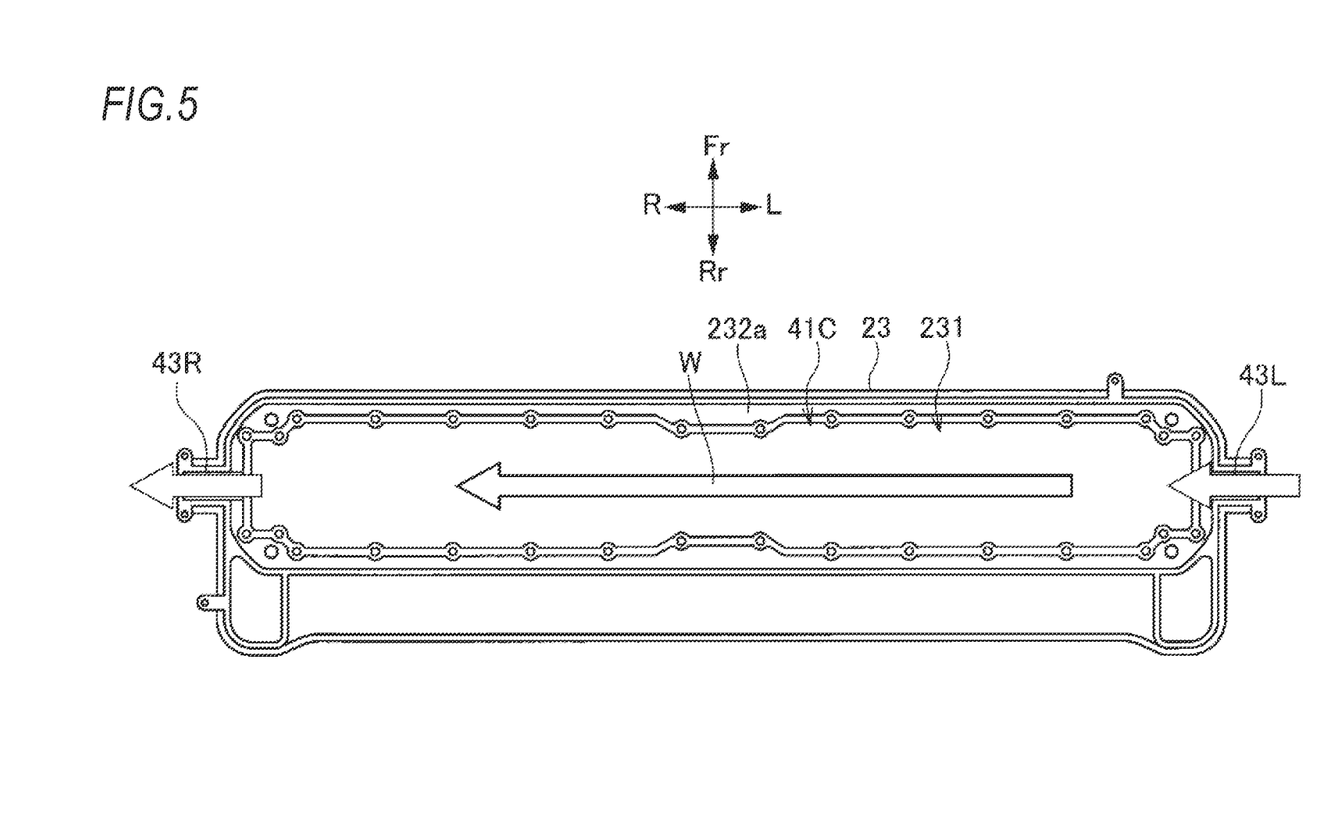
FIG. 5 is a diagram illustrating a refrigerant flow path of a second battery module.
Figure 6:
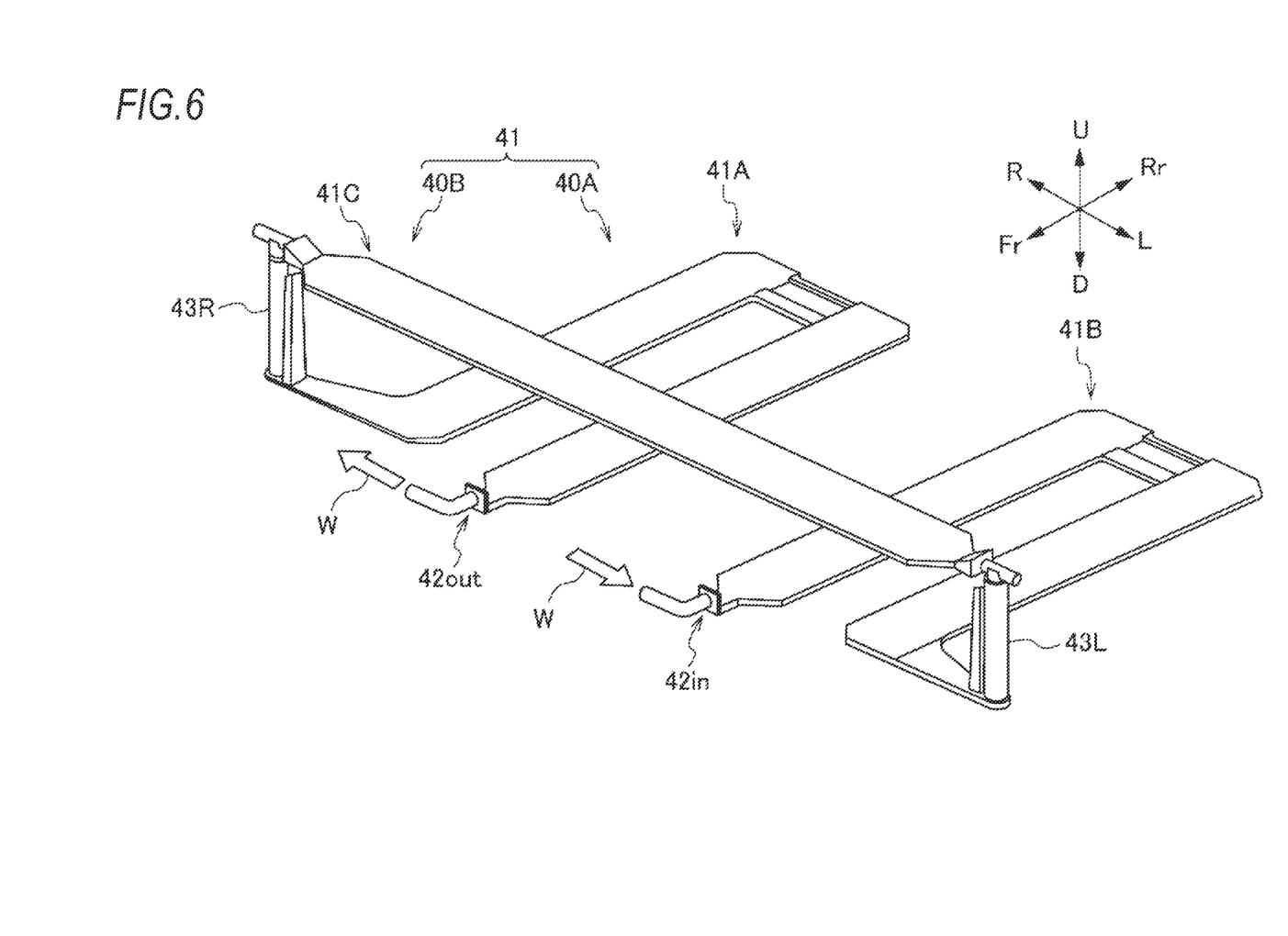
FIG. 6 is a diagram illustrating the entire refrigerant flow path of the battery pack.

As illustrated in FIGS. 4 to 6, the first cooling mechanism 40A for cooling the first battery module 11 and the second cooling mechanism 40B for cooling the second battery module 21 form a continuous refrigerant flow path 41 through which refrigerant W passes. The refrigerant W is water, oil, Automatic Transmission Fluid (ATF), or the like. To explain in more detail, the refrigerant flow path 41 includes a lower right flow path 41A for cooling the two first battery modules 11 accommodated in an area on the right side of the first case body 12, a lower left flow path 41B for cooling the two first battery modules 11 accommodated in an area on the left side of the first case body 12, and an upper flow path 41C for cooling the two second battery modules 21 of the second battery pack 20. The white arrows illustrated in FIGS. 4 to 6 conceptually indicate the refrigerant W and the direction of its flow.

In this example, the refrigerant W flows into the lower left flow path 41B from a refrigerant inlet 42in, cools the two first battery modules 11 accommodated in the area on the left side of the first case body 12, and then the refrigerant W goes up in a vertical pipe 43L provided in a left wall of the first case body 12 and enters the upper flow path 41C. After cooling the two second battery modules 21 of the second battery pack 20, the refrigerant W goes down a vertical pipe 43R provided in a right wall of the first case body 12 and enters the lower right flow path 41A, and then the refrigerant W cools the two first battery modules 11 accommodated in the area on the right side of the first case body 12 and flows out from a refrigerant outlet 42out. With this configuration, all battery modules 11 and 21 of the battery pack 1 are cooled by the refrigerant W.

As illustrated in FIG. 4, a lower surface 121a of a bottom portion 121 of the first case body 12 is provided with cooling recesses 122R and 122L separately for the right side portion and the left side portion. The lower right flow path 41A is formed by sealing the cooling recess 122R on the right side with a cover member 14R on the right side illustrated in FIG. 3 and the lower left flow path 41B is formed by sealing the cooling recess 122L on the left side with a cover member 14L on the left side illustrated in FIG. 3.

As illustrated in FIG. 5, a cooling recess 231 is provided on a lower surface 232a of the bottom plate 23 of the second battery case 20A and the upper flow path 41C is formed by sealing the cooling recess 231 with the first case cover 13 (FIG. 2). In this way, by sealing the cooling recess 231 provided on the lower surface 232a of the bottom plate 23 with the first case cover 13, the upper flow path 41C forming a part of the refrigerant flow path 41 can be easily formed.

Fixed Structure of Second Battery Module

Hereinafter, the fixed structure of the second battery module 21 will be described in detail with reference to FIGS. 7 to 9.

As illustrated in FIG. 8, the second battery module 21 is fastened to the bottom plate 23 of the second battery case 20A by a pair of bolts 50 penetrating both ends of each end plate 26 in the front-rear direction.

Figure 9:
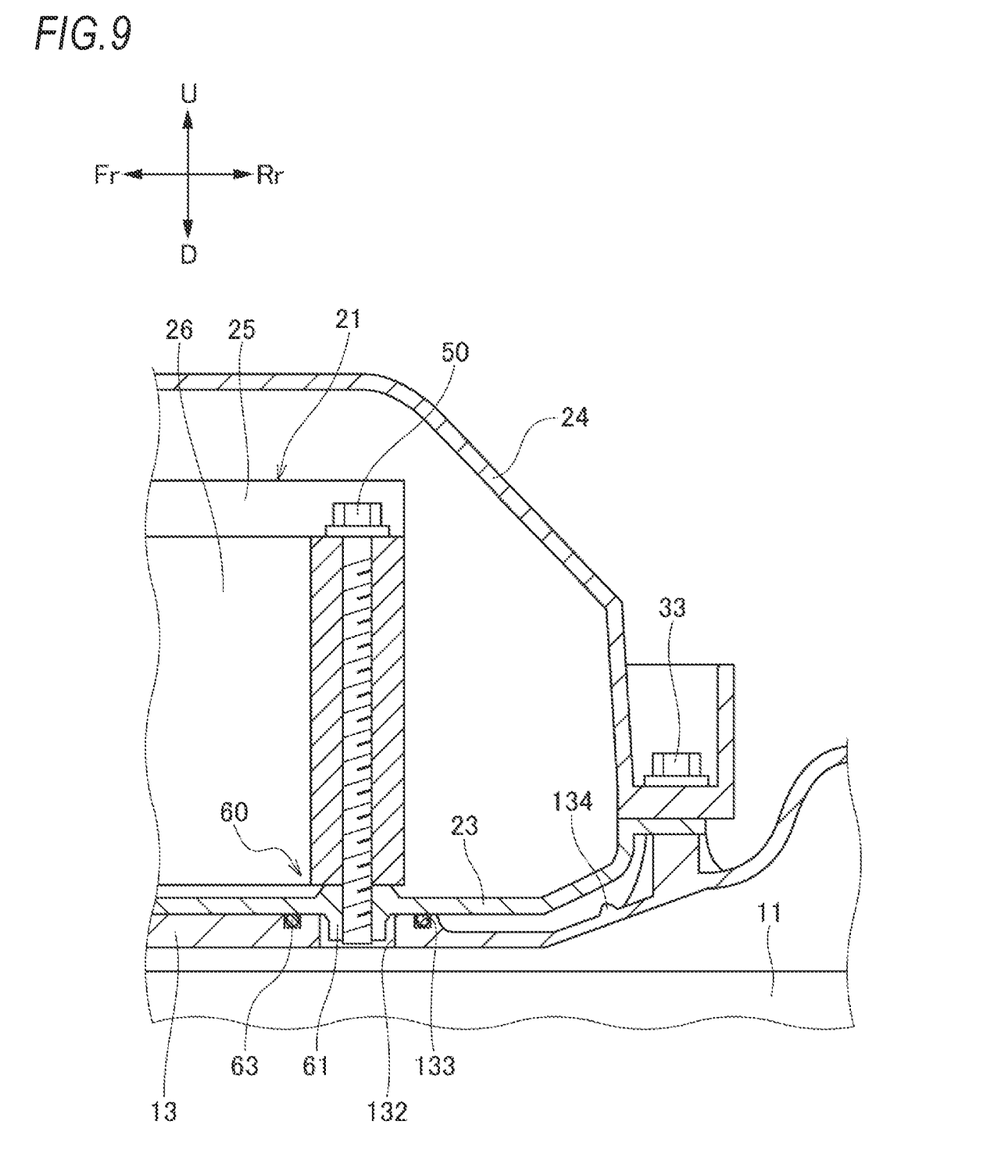
FIG. 9 is a diagram illustrating a fixed structure of the second battery module of the embodiment and is an enlarged view of a portion B in FIG. 8.
Figure 10:
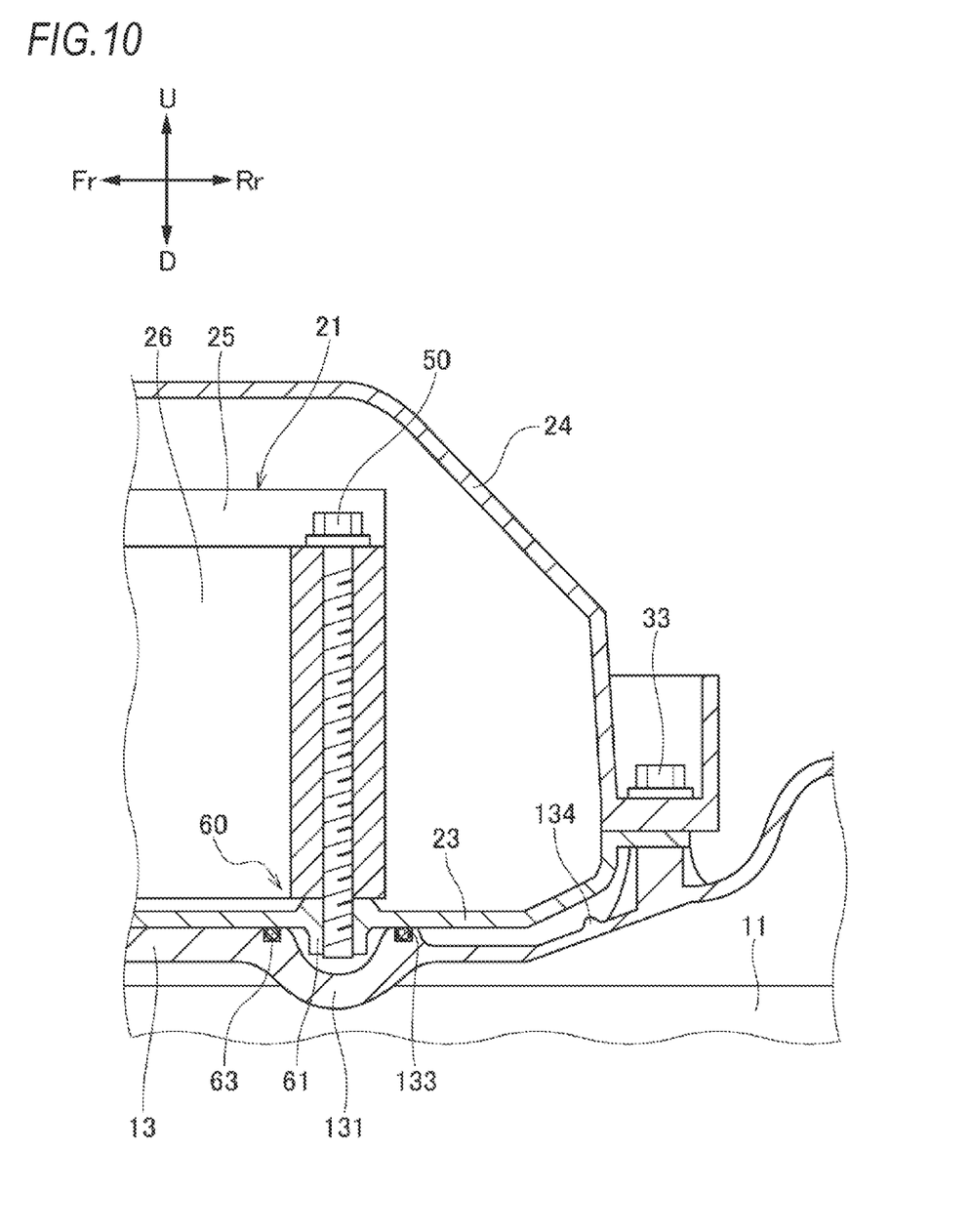
FIG. 10 is a diagram illustrating a fixed structure of a second battery module of a comparative example.

As illustrated in FIG. 9, a boss 61 for reinforcement is formed in a fastening portion 60 of the bottom plate 23 of the second battery case 20A and the boss 61 in which a female thread portion to be fastened by the bolt 50 is formed bulges downward. The female thread portion is formed on an inner peripheral surface of the through-hole penetrating the boss 61. Below the bottom plate 23, there is the first case cover 13 of the first battery case 10A to which the bottom plate 23 is fastened. Therefore, as illustrated in a comparative example of FIG. 10, it is conceivable to form a bulging portion 131 projecting downward so as to avoid the boss 61 on the first case cover 13. However, when the bulging portion 131 is formed, in order to avoid contact between the bulging portion 131 and the first battery module 11, it is necessary to provide a predetermined clearance between the bulging portion 131 of the first case cover 13 and the first battery module 11. In this case, the battery pack 1 becomes larger in the height direction. On the other hand, even when the bottom plate 23 itself is thickened without providing the boss 61 on the bottom plate 23, the battery pack 1 becomes larger in the height direction and the weight also increases.

Figure 7:
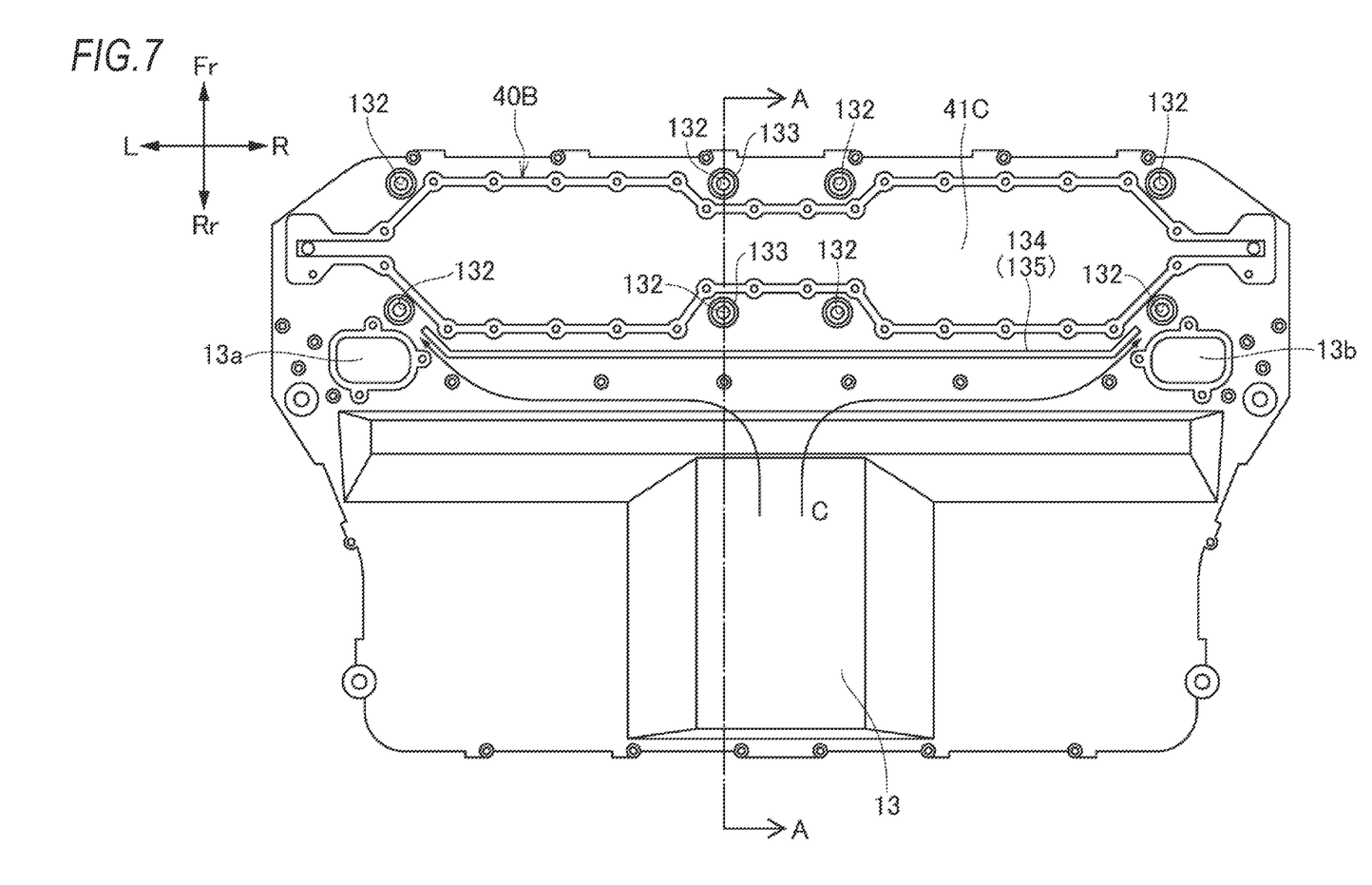
FIG. 7 is a plan view illustrating an upper surface of a second battery case.

Therefore, in the embodiment, as illustrated in FIGS. 7 to 9, the first case cover 13, which forms the upper surface of the first battery case 10A, is provided with a hole portion 132 for accommodating the fastening portion 60 at a position overlapping the fastening portion 60 when viewed from above. As a result, it is not necessary to provide the bulging portion 131 in the first case cover 13, and thus it is possible to prevent the first case cover 13 and the first battery module 11 from interfering with each other without enlarging the height dimension of the battery pack 1. Further, since it is not necessary to thicken the bottom plate 23 of the second battery pack 20, the battery pack 1 does not become large in the height direction and the weight does not increase.

The hole portion 132 is preferably a through-hole which penetrates the first case cover 13. By making the hole portion 132 a through-hole, the thickness of the first case cover 13 can be reduced. Further, it is preferable that the bolt 50 and the fastening portion 60 do not bulge below the hole portion 132. Therefore, the clearance above the first battery module 11 can be set with reference to the lower surface of the first case cover 13, and thus the bolt 50 and the fastening portion 60 do not interfere with the first battery module 11.

Further, a seal groove 133 having an annular shape and surrounding the hole portion 132 is provided on the upper surface of the first case cover 13 and a seal member 63 in contact with the bottom plate 23 is arranged in the seal groove 133. The seal member 63 is, for example, an O-ring. By arranging the seal member 63 so as to surround the hole portion 132 in this way, a space between the first case cover 13 and the bottom plate 23 can be separated from an internal space of the first battery case 10A. As a result, the infiltration of water into the internal space of the first battery case 10A can be suppressed.

In particular, in the embodiment, the upper flow path 41C of the second cooling mechanism 40B described above is provided between the first case cover 13 and the bottom plate 23. Therefore, even when the refrigerant W leaks from the upper flow path 41C of the second cooling mechanism 40B, it is possible to prevent the refrigerant W from entering the internal space of the first battery case 10A.

As illustrated in FIG. 7, the hole portion 132 is arranged outside the upper flow path 41C of the second cooling mechanism 40B. In other words, the upper flow path 41C of the second cooling mechanism 40B is provided on the lower side of the second battery module 21 so as to avoid the hole portion 132. Further, on the upper surface of the first case cover 13, a protrusion 134 extending in the left-right direction along the upper flow path 41C is provided further outside the upper flow path 41C and the hole 132.

As a result, as illustrated by the arrow C in FIG. 7, even when water droplets or the like generated on the first case cover 13 flow toward the hole portion 132 side, they are guided to both the left and right sides of the first case cover 13 by the protrusion 134 and discharged. Since the protrusion 134 functions as a water blocking wall in this way, it is possible to prevent water from accumulating around the hole portion 132 and deteriorating the seal member 63. In particular, the periphery of the two hole portions 132 located substantially in the center in the left-right direction and the front-rear direction is surrounded by the flow path wall which partitions the upper flow path 41C. Therefore, when water enters, it will be difficult for water to escape.

In addition, instead of the protrusion 134, a groove 135 may be provided on the upper surface of the first case cover 13. Since the groove functions as a drainage groove, it is possible to prevent water from accumulating around the hole portion 132 and deteriorating the seal member 63.

The present invention is not limited to the embodiment described above and can be appropriately modified, improved, and the like.

In the embodiment described above, as the temperature adjusting mechanism, the cooling mechanism including the first cooling mechanism 40A for cooling the first batten module 11 and the second cooling mechanism 40B for cooling the second battery module 21 is described. However, the temperature adjusting mechanism may be a heating mechanism which heats the first battery module 11 and the second battery module 21. Further, the temperature adjusting mechanism may heat or cool the first battery module 11 and the second battery module 21. Under this idea, "cooling" is extended to the concept of "temperature adjustment".

In addition, at least the following matters are described in this specification. The components and the like corresponding to those of the embodiment described above are shown in parentheses, but the present invention is not limited to these.

(1) A battery pack (battery pack 1) which includes a first battery module (first battery module 11), a first battery case (first battery case 10A) accommodating the first battery module, a second battery module (second battery module 21), and a second battery case (second battery case 20A) placed on an upper side of the first battery case so as to overlap each other and accommodating the second battery module, where the second battery module is fixed to a fastening portion (fastening portion 60) formed on a bottom surface (bottom plate 23) of the second battery case and bulging downward, and a hole portion (hole portion 132) for accommodating the fastening portion is provided on an upper surface (first case cover 13) of the first battery case at a position overlapping the fastening portion when viewed from above.

According to (1), the upper surface of the first battery case is provided with the hole portion for accommodating the fastening portion which bulges downward. Therefore, while preventing the upper surface of the first battery case from interfering with the first battery module, it is possible to prevent the battery pack from becoming larger in the up-down direction.

(2) The battery pack according to (1), where the hole portion is a through-hole penetrating the upper surface of the first battery case, a groove (seal groove 133) having an annular shape and surrounding the hole portion is provided on the upper surface of the first battery case, and a seal member (seal member 63) which abuts on the bottom surface of the second battery case is arranged in the groove.

According to (2), the seal member can separate the space between the upper surface of the first battery case and the bottom surface of the second battery case from the internal space of the first battery case, and thus it is possible to suppress the infiltration of water into the internal space of the first battery case.

(3) The battery pack according to (2), where
a temperature adjusting flow path (upper flow path 41C) through which refrigerant (refrigerant W) flows is formed between the upper surface of the first battery case and the bottom surface of the second battery case,
the hole portion is arranged outside the temperature adjusting flow path, and
the upper surface of the first battery case is provided with a protrusion (protrusion 134) extending along the temperature adjusting flow path outside the temperature adjusting flow path and the hole portion.

According to (3), the upper surface of the first battery case is provided with the protrusion extending along the temperature adjusting flow path outside the temperature adjusting flow path and the hole portion. Therefore, the protrusion functions as a water blocking wall and can prevent water from accumulating around the hole portion and deteriorating the seal member.

(4) The battery pack according to (2), where
a temperature adjusting flow path (upper flow path 41C) through which refrigerant (refrigerant W) flows is formed between the upper surface of the first battery case and the bottom surface of the second battery case,
the hole portion is arranged outside the temperature adjusting flow path, and
the upper surface of the first battery case is provided with a groove (groove 135) extending along the temperature adjusting flow path outside the temperature adjusting flow path and the hole portion.

According to (4), the upper surface of the first battery case is provided with the groove extending along the temperature adjusting flow path outside the temperature adjusting flow path and the hole portion. Therefore, the groove functions as a drainage ditch and can prevent water from accumulating around the hole portion and deteriorating the seal member.

(5) The battery pack according to any one of (2) to (4), where
the second battery module is fixed to the fastening portion by a bolt,
the hole portion is a through-hole penetrating the upper surface of the first battery case, and
the bolt and the fastening portion do not bulge below the hole portion.

According to (5), the bolt and the fastening portion do not bulge below the hole portion. Therefore, it is possible to prevent the battery pack from becoming larger in the up-down direction while preventing the bolt and the fastening portion from interfering with the first battery module.

What is claimed is:

1. A battery pack comprising:
a first battery module;
a first battery case accommodating the first battery module;
a second battery module, and
a second battery case placed on an upper side of the first battery case so as to overlap each other and accommodating the second battery module, wherein
the second battery module is fixed to a fastening portion formed on a bottom surface of the second battery case and bulging downward,
a hole portion for accommodating the fastening portion is provided on an upper surface of the first battery case at a position overlapping the fastening portion when viewed from above,
the hole portion is a through-hole penetrating the upper surface of the first battery case,
a groove having an annular shape and surrounding the hole portion is provided on the upper surface of the first battery case, and
a seal member which abuts on the bottom surface of the second battery case is arranged in the groove.

2. The battery pack according to claim 1, wherein
a temperature adjusting flow path through which refrigerant flows is formed between the upper surface of the first battery case and the bottom surface of the second battery case,
the hole portion is arranged outside the temperature adjusting flow path, and
the upper surface of the first battery case is provided with a protrusion extending along the temperature adjusting flow path outside the temperature adjusting flow path and the hole portion.

3. The battery pack according to claim 1, wherein
a temperature adjusting flow path through which refrigerant flows is formed between the upper surface of the first battery case and the bottom surface of the second battery case,
the hole portion is arranged outside the temperature adjusting flow path, and
the upper surface of the first battery case is provided with a groove extending along the temperature adjusting flow path outside the temperature adjusting flow path and the hole portion.

4. The battery pack according to claim 1, wherein
the second battery module is fixed to the fastening portion by a bolt,
the hole portion is a through-hole penetrating the upper surface of the first battery case, and
the bolt and the fastening portion do not bulge below the hole portion.

* * * * *